J. E. OGDEN.
CABLE CLAMP.
APPLICATION FILED JUNE 18, 1912.

1,060,015.

Patented Apr. 29, 1913.

WITNESSES
F. Graves.
G. Quimby.

INVENTOR
John Edward Ogden
BY
E. W. Marshall
ATTORNEY

UNITED STATES PATENT OFFICE.

JOHN EDWARD OGDEN, OF BROOKLYN, NEW YORK.

CABLE-CLAMP.

1,060,015.

Specification of Letters Patent. Patented Apr. 29, 1913.

Application filed June 18, 1912. Serial No. 704,422.

*To all whom it may concern:*

Be it known that I, JOHN EDWARD OGDEN, a citizen of the United States, and a resident of Brooklyn, county of Kings, and State of New York, have invented certain new and useful Improvements in Cable-Clamps, of which the following is a specification, reference being had to the accompanying drawings, forming a part thereof.

This invention relates to devices for hanging or supporting electric cables and wires along the surface of walls, ceilings, fences or other structures.

The object of the invention is to improve the mode of attaching the so-called bridle ring to the clamp. As now commonly constructed the cable clamps are provided with threaded holes into which the shank or stem of the bridle ring is adapted to be screwed. When the cable line is erected it is often customary to leave off the bridle rings as they are not needed at first. The hole in the clamp is thus exposed to the weather and the metal soon rusts. Later when it is desired to run a messenger wire, and attempts are made to put in place the bridle rings on the clamps, it is often found that the threads in the holes provided therefor have corroded so badly or have otherwise become so damaged that they will not properly engage and hold the shank or stem of the bridle ring.

Accordingly, the primary purpose of this invention is to overcome the objections inherent in the clamps as heretofore made, by obviating the necessity of a screw threaded hole in the clamp. To this end the invention contemplates the provision of a removable member which is adapted to be placed in position on the clamp when the messenger wire is to be erected, said member being adapted to engage the shank or stem of the bridle ring and be held in place on said clamp. These removable members are not placed in position until the messenger wire is to be installed, thus preventing any corrosion or deterioration due to exposure to the weather.

I will describe my invention in the following specification and point out the novel features thereof in appended claims.

Figure 1:
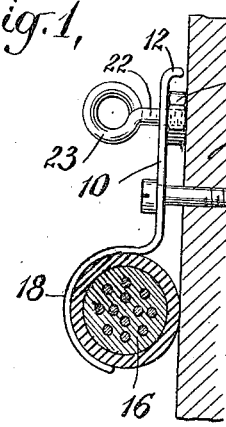
Figure 2:
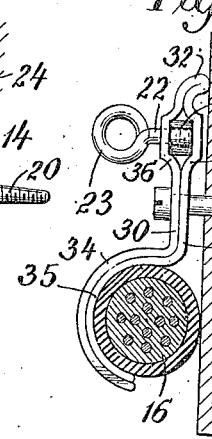
Figure 3:
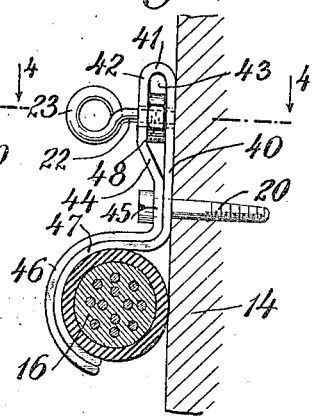
Figure 6:
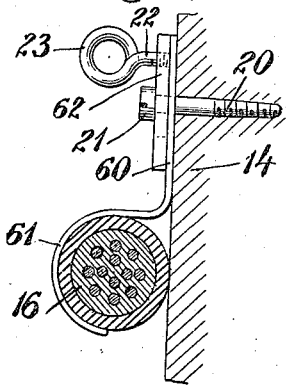
Figure 5:
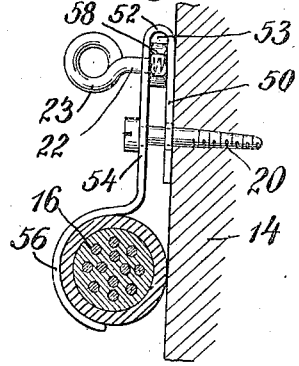
Figure 4:
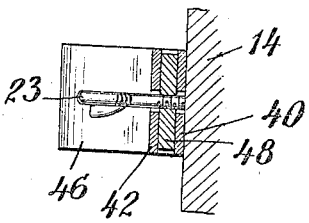
Figure 7:
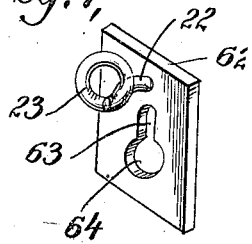
Figure 8:
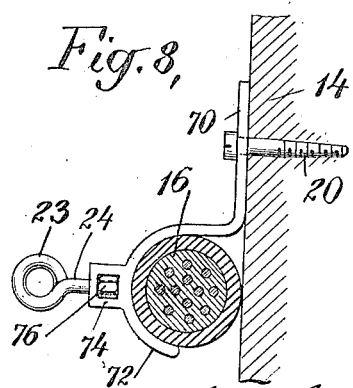

In the accompanying drawing, Figure 1 is a side elevation of one embodiment of the invention. Fig. 2 is a side elevation of a modified form. Fig. 3 is a side elevation of another modified form. Fig. 4 is a horizontal section taken on the line 4—4 in Fig. 3. Fig. 5 is a side elevation of a simplified form of the device shown in Figs. 3 and 4. Fig. 6 is another structure which embodies my invention and Fig. 7 is a fragmentary perspective view of a portion of the device shown in Fig. 6. Another modification of the invention also in side elevation is illustrated in Fig. 8.

Like reference characters indicate corresponding parts in all of the figures.

As illustrated in Fig. 1 the hanger comprises a clamping member formed of a sheet metal strap having a flat portion 10 and bent at its upper end at substantially right angles to form a lateral projection or toe 12 adapted to engage the wall or other support 14 upon which the cable 16 is carried. The lower portion of the clamping member is curved at 18 to conform to the exterior of the cable 16.

A hole is provided in the flat portion 10 to receive a screw 20 with which the hanger is affixed to a wall or other structure 14. This securing member is preferably a screw, as shown, although any other suitable device may be employed. The flat portion 10 is also provided with a smooth bored hole to receive the shank or stem 22 of a bridle ring 23. The stem 22 is screw threaded and adapted to fit a correspondingly threaded anchorage member such for example as a nut 24. This nut is preferably a little thicker than the depth of the toe 12, so that when the securing member 20 is tightened up the nut will be clamped between the plate 10 and the support 14 and prevented from turning. When the cable line is erected without the messenger wire and bridle rings, the nuts 24 are omitted and the toe 12 engages the wall 14. When it is desired to erect the messenger wire, the screw 20 is loosened slightly to enable the nut 24 to be slipped under the plate 10 in a position to receive the screw threaded shank of the bridle ring. Then the screw 20 is again tightened, and the stem or shank of the bridle ring is screwed into the nut.

As illustrated in Fig. 2 the hanger or clamp comprises a sheet metal strap bent back upon itself to form a double thickness. It comprises a double flat portion 30, 31 the upper doubled end of which is bent at substantially right angles to form a lateral projection or toe 32, which is adapted to engage the face of a wall or support 14. The lower portion of the clamp is curved at 34, 35 to conform to the exterior of the cable 16. The portions 30, 31 are provided with registering holes to receive the securing screw 20, with which the hanger is affixed to the support 14. The flat portions 30, 31 are deflected in opposite directions at 36, 37 to form opposed channels which are adapted to receive between them a nut 38 and the part forming the outer channel portion is provided with an unthreaded aperture through which the stem 22 of the bridle ring 23 is adapted to pass. The nut 38 is removably held between the two portions 36, 37 of the clamp and may be readily inserted in place or removed by spreading apart the two sections of the clamp. When the cable line is first erected the nuts 38 may be omitted if no bridle rings are to be attached, in which instance the screw 20 will hold the clamp against the cable 16 and the toe 32 against the wall 14. If extra wires are to be run, then the screw 20 will be loosened sufficiently to permit the insertion of the nut 38 between the channeled portions 36 and 37. Thereupon the screw 20 is tightened to clamp the cable, and the nut 38 is thereby clamped between the opposing sections of the clamp. Then the screw threaded stem 22 of the bridle ring 23 is passed through the hole in the portion 36 and screwed into the nut 38.

As illustrated in Figs. 3 and 4 the hanger or clamp is composed of a sheet metal strap bent back upon itself to form a double thickness. It comprises a flat portion 40 which provides a flat base or bearing portion which is adapted to engage the face of the wall 14. The strap is formed with a bend 41 at its upper end and with a portion 42 parallel to the base 40 and separated therefrom by a space 43. This portion of the strap is then bent downwardly and rearwardly at 44 to a flat portion 45 adapted to lie against the flat portion or base 40. Then both layers or sections of the strap are curved at 46, 47 to conform to the exterior of the cable 16. The flat portions 40, 45 are provided with registering holes to receive the screw 20, with which the hanger is affixed to the support 14. The part 42 may also be provided with a hole, through which the stem 22 of the bridle ring 23 may pass. A nut 48 is adapted to be removably held between the base 40 and the parallel portion 42, to receive the screw threaded stem 22 of the bridle ring 23, when it is desired to erect a messenger wire in the manner set forth above.

The construction illustrated in Fig. 5 is somewhat like that last described, but in this case a single thickness of metal 50 is arranged to form the base which lies against the wall 14. This is bent over at 52 and downward to form the part 54 parallel with but separated from the part 50, leaving between them a space 53. Holes in alinement with each other are provided in the parts 50 and 54 to receive the holding screw 20 and another hole in the part 54 provides for the insertion of the shank of the bridle ring. The lower end of the portion 54 is bent as at 56 to fit the cable 16. The bridle ring 23 may be affixed to this device when desired by loosening screw 20, inserting between the parts 50 and 54 a loose nut 58, and screwing the threaded shank 22 of the bridle ring into this nut.

As illustrated in Figs. 6 and 7 the clamp comprises a sheet metal strap having a flat portion or base 60 provided with a hole through which the screw 20 may pass to secure the clamp in position on the support 14. The lower portion 61 is curved to conform to the exterior of the cable 16. When it is desired to mount a bridle ring upon this clamp a flat block 62 is provided, having a slot 63 provided with an enlarged portion 64 through which the head 21 of the screw 20 may pass. Into this block the stem 22 of the bridle ring 23 is secured either by being screwed therein or riveted in place. Then when the block 62 is slipped in place with the head 21 of the screw 20 over the upper portion of the slot 63, the screw is tightened to clamp the block against the base 60 and the base against the support 14.

The structure shown in Fig. 8 is preferably a casting having a flat base 70 adapted to rest against the wall 14, with a hole for the reception of the securing screw 20, and having a hook-like portion 72 which partly surrounds the cable 16. In this hook-like part a recess 74 is formed with a hole passing into it from the outside. A nut 76 may be slipped into this recess and the threaded shank 22 of the bridle ring screwed into it.

From the description above set forth it will be noted that a secure anchorage is provided in each instance for the stem of the bridle ring, which anchorage is not subjected to corrosion or deterioration prior to the installation of the bridle rings for a messenger wire or extra wires and that when the securing screw is tightened up the cable and the anchorage for the stem are securely clamped in place and a thoroughly rigid strong structure is provided.

What I claim is:

1. A hanger for supporting a cable against a wall or similar surface, comprising a double clamp having one end bent to partially encircle the cable and having a portion adapted to engage said surface, said clamp having its two opposed portions separated to provide a space therebetween, a removable anchorage member adapted to be held in said space, and a bridle ring affixed to said anchorage member.

2. A hanger for supporting a cable against a wall or similar surface, comprising a bent body portion adapted to partially encircle the cable, and a portion adapted to rest against the surface, a removable anchorage member adapted to be held on said clamp, a screw for holding said hanger in place on the wall and for exerting a clamping pressure upon said anchorage member and a bridle ring having a stem passing through said hanger and screwed into said anchorage member.

In witness whereof, I have hereunto set my hand this 17th day of June 1912.

JOHN EDWARD OGDEN.

Witnesses:
 I. B. MOORE,
 ELIZABETH ALEXANDER.